UNITED STATES PATENT OFFICE 2,675,373

SUPPRESSION OF ACIDIC GAS EVOLUTION

John W. Brooks, Wenonah, and Seymour L. Meisel, West Deptford Township, Gloucester County, N. J., assignors to Socony-Vacuum Oil Company, Incorporated, a corporation of New York No Drawing. Application November 15, 1950, Serial No. 195,916

12 Claims. (Cl. 260—139)

This invention relates, broadly, to systems which slowly evolve acidic gases. It is more particularly concerned with stabilizing these systems against such evolution.

A "system which slowly evolves acidic gases," as contemplated herein refers to a mixture of materials, or a solution, which undergoes gradual deterioration or decomposition, thus evolving small amounts of acidic gases. Such a system can be a solution or a suspension of somewhat unstable chemical compounds or reaction products in a solvent, such as water, mineral oil, alcohol, etc. It can also be an impure chemical or a mixture of two or more chemicals, such as is encountered in a reaction product. It must be clearly understood that the term, "system," does not include a mixture or a solution of two or more reactants which react to produce copious quantities of acidic gases. Thus, for example a solution of sodium sulfide in water will slowly evolve small amounts of hydrogen sulfide. It is a system within the contemplation of this invention. On the other hand, a mixture of sodium sulfite, iodine and water would not be considered a system herein, because the materials in this mixture react to produce hydrogen iodide gas.

As is well known to those familiar with the art, many substances tend to give off small amounts of acidic gases, such as hydrogen sulfide, hydrogen chloride, hydrogen cyanide, and the like. Such gases are objectionable from several standpoints. They may corrode metal parts with which they come in contact. Likewise, their odor, particularly the odor of the hydrides of the elements of group VI-A of the periodic chart of the elements (hydrogen sulfide, hydrogen selenide and hydrogen telluride), is very disagreeable. Hydrogen cyanide is exceedingly dangerous from a toxological standpoint. Some depilatory preparations contain metal sulfides and hydrosulfides which have a tendency to give off small amounts of hydrogen sulfide. The odor thus produced causes a customer resistance to otherwise meritorious products.

Many organic sulfur-containing reaction products have been proposed for addition to mineral lubricating oils to improve the oxidation stability and/or extreme pressure characteristics thereof. For example, the reaction product of α-pinene with phosphorus pentasulfide has been proposed as an antioxidant for mineral oils. Such additives, however, usually evolve hydrogen sulfide, both during use and during storage, regardless of whether they have been blended in a mineral oil or not. This is disadvantageous from several standpoints. The hydrogen sulfide can corrode bearing surfaces and other metal parts with which it comes into contact. Also, when hydrogen sulfide is formed, the additive may be destroyed, thus depriving the lubricant of the improved characteristics imparted to it by the additive. From a commercial standpoint, the odor of the hydrogen sulfide evolving from additives, or from lubricants containing them is very undesirable. Likewise, the buildup of gas pressure, due to the formation of hydrogen sulfide, presents a constant danger of explosions during the shipping and handling of sealed containers containing such additives.

In accordance with the present invention, it has now been discovered that systems which slowly evolve small amounts of acidic gases can be stabilized against such an occurrence. It has now been found that the addition of minor amounts of certain aldehydes to such systems effectively suppresses the evolution of acidic gases therefrom.

Accordingly, it is a broad object of the present invention to provide a method for suppressing the evolution of acidic gases from systems which slowly evolve them. Another object is to provide a system in which the gradual evolution of acidic gases therefrom is suppressed. A further object is to provide a method for suppressing the evolution of hydrogen sulfide from an aqueous system. A specific object is to provide organic phosphorus- and sulfur-containing additives containing a minor amount of certain aldehydes; and to provide mineral lubricating oils containing such stabilized additives. Other objects and advantages of the present invention will become apparent to those skilled in the art from the following detailed description.

Broadly stated, the present invention provides a method for suppressing the evolution of acidic gases from a system from which they are gradually evolved, which comprises adding to the system an aldehyde selected from the group consisting of aliphatic aldehydes having fewer than 10 carbon atoms per molecule, which contain the group, C=C—C=O, and thiophene aldehydes. This invention also provides a mineral lubricating oil containing a minor amount, sufficient to improve the oxidation characteristics thereof, of an oil-soluble organic sulfur-containing reaction product which reaction product contains an aldehyde selected from the aforementioned group of aldehydes; and the oil-soluble organic sulfur-containing reaction product containing such aldehydes.

As is well known to those familiar with the art, many inorganic salts evolve acidic gases when they are dissolved or suspended in water, alcohol, or other polar solvents. Such salts are, by way of non-limiting examples, sodium hydrosulfide, sodium sulfide, calcium hydrosulfide, barium sulfide and potassium cyanide. A system containing such salts can be a solution of the salt in a polar solvent or a suspension therein. Likewise, it can be a solid or fluid emulsion containing such salts, such as, for example, a depilatory cream containing a metallic sulfide. Such solutions and emulsions which gradually evolve acidic gases are well known to the art and need not be described in detail herein. The evolution of acidic gases from these systems can be suppressed by adding thereto a small amount of one of the aforementioned aldehydes.

Many organic reaction products evolve acidic gases to varying extents. Such products are those containing halogen atoms, sulfur atoms, phosphorus and sulfur atoms, nitrile groups, etc. Such reaction products are considered to be systems from which the evolution of acidic gases can be suppressed in accordance with this invention. Likewise, solutions or suspensions of these reaction products in solvents, such as mineral oils, light petroleum solvents, benzene, animal and vegetable fats and oils, emulsions of the foregoing solvents, etc., are systems within the contemplation of this invention.

Non-limiting examples of the organic reaction products referred to herein are described in a number of U. S. patents. These will be described briefly, although it must be clearly understood that the patents are to be consulted for more detailed information. Accordingly, the specifications of these patents are to be considered to be part of this specification.

In U. S. Patent No. 1,963,489, Fuller et al. disclose the addition of dialkyl disulfides to mineral oils. The use of sulfurized pine oil is set forth in U. S. Patent No. 2,012,446, to Edwards et al. Reiff describes reaction products of phenols, sulfur and chlorinated wax, in U. S. Patent Nos. 2,061,008 and 2,062,676. U. S. Patent No. 2,081,886, to Story et al. relates to the use of disulfides or organic compounds. Evers, in U. S. Patent No. 2,088,193, describes the reaction product of stannic chloride and a mercaptan-containing organic acid. The dixanthyl ethyl ethers are described by Moran, in U. S. Patent No. 2,113,828. U. S. Patent No. 2,137,410, to Moran et al. relates to sulfurized terpenes. Berger et al. describe polychlorinated aliphatic compounds in which part of the chlorine has been replaced by a thio-carbonate group, in U. S. Patent No. 2,153,496. U. S. Patent No. 2,161,566, to Fuller et al. relates to alkyl esters of alkyl xanthates. Moran et al., in U. S. Patents Nos. 2,162,207 and 2,162,208, disclose arylamino polysulfides and aniline disulfide in mineral oil. The reaction product of an arylamine and sulfur is described by Crandall et al., in U. S. Patent No. 2,164,151. The reaction product of mineral oils or fatty oils with phosphorus compounds, including phosphorus sulfides, is described in U. S. Patent No. 2,142,998, to Chittick. U. S. Patent No. 2,169,634, to Cantrell et al. relates to the reaction product of $P_4S_3$ with water-insoluble reaction products of phenols and olefins. A reaction product of the aforedescribed phenol-olefin reaction product with $P_2S_5$ and/or $PCl_3$ is described by Cantrell et al. in U. S. Patent No. 2,226,334. Hamilton et al. disclose the reaction product of sulfur chloride with extracts obtained from solvent-refining of petroleum, in U. S. Patent No. 2,193,331. The reaction product of a perchloromethyl mercaptan and an unsaturated organic compound is described by Badertscher et al., in U. S. Patent No. 2,197,781. U. S. Patent No. 2,202,641, to Badertscher et al. relates to the reaction product of an alkali thiocyanate and a halogenated organic compound. Organic disulfides are disclosed by Story et al., in U. S. Patent No. 2,211,798. In U. S. Patent No. 2,218,447, Badertscher describes the reaction product of an aliphatic amine and sulfur dichloride. U. S. Patent No. 2,228,252, to Berger et al. relates to the use of perchloromethyl mercaptans. Reiff describes sulfides of metal salt of alkyl-substituted hydroxyaromatic carboxylic acids, in U. S. Patents Nos. 2,256,441 and 2,256,443. The reaction product of SCl or SCl and $PCl_3$ with phenol olefins (see U. S. Patent No. 2,253,227) is described by Cantrell et al. in U. S. Patent No. 2,258,228. U. S. Patent No. 2,260,303, to Engelke, relates to sulfurized organic phosphines. Sulfurized cresyl phosphate or phosphite is set forth in U. S. Patent No. 2,301,918, to Morgan. Williams discloses a reaction product obtained by reacting a fatty oil with a phosphorus sulfide and then with sulfur monochloride, in U. S. Patent No. 2,274,022. The reaction product of halogenated aliphatic, aromatic, or terpene compounds with a phosphorus sulfide has been described in U. S. Patent No. 2,307,183, to Zimmer et al. Polymeric monoolefins have been reacted with a phosphorus sulfide by Loane et al. in U. S. Patent No. 2,316,078. In U. S. Patent No. 2,316,081, Loane et al. disclose the reaction product of an aromatic hydrocarbon, or of a mineral oil fraction containing it, with a phosphorus sulfide. A product derived by reacting a phosphorus sulfide with a high molecular weight compound capable of increasing the viscosity index of a mineral oil has been defined by Kelso et al. in U. S. Patent No. 2,316,085. MacClaren, in U. S. Patent No. 2,316,086, discloses the reaction of a halogenated, aliphatic hydrocarbon with an aromatic compound to obtain a reaction product which is further reacted with a phosphorus sulfide. U. S. Patent No. 2,316,087, to Gaynor et al., discloses the treatment of hydrocarbon or olefin polymers with a phosphorus sulfide. In U. S. Patent No. 2,316,088, Loane et al. broadly describe the reaction of a hydrocarbon with a phosphorus sulfide. A reaction product obtained by copolymerizing a low molecular weight monoolefin with a more unsaturated olefin, such as a conjugated diolefin, and then reacting the copolymer with a phosphorus sulfide, is disclosed in U. S. Patent No. 2,316,089, to Anderson. In U. S. Patent No. 2,283,494, Moran et al. have described the reaction of phosphorus pentasulfide with unsaturated aliphatic ketones. In U. S. Patent No. 2,383,497, Otto et al. disclose the reaction product of phosphorus pentasulfide with sulfurized dioleyl ketone. The reaction product of phosphorus pentasulfide with an alkyl-substituted phenol is set forth in U. S. Patent No. 2,386,207, to Reiff et al. Williams et al. disclose the reaction product of an olefinic alcohol derived from petroleum with phosphorus pentasulfide in U. S. Patent No. 2,388,199. In accordance with U. S. Patent No. 2,393,934 to Reiff et al., a reaction product is obtained by reacting a phosphorus sulfide with an amide of an alkyl-substituted aromatic carboxylic acid. In U. S. Patent No. 2,411,153, Fuller et al. teach the reaction of oleyl alcohol with phosphorus pentasulfide. The reaction product of phosphorus pentasulfide and oxidized paraffin wax is described by Fuller et al. in U. S. Patent No. 2,427,272. Reiff et al., in U. S. Patent No. 2,441,331, teach that a reaction product is obtained by reacting a phosphorus sulfide with a phosphorus amine of an alkyl-substituted hydroxyaromatic compound. The reaction products of alkyl halides with a phosphorus sulfide are disclosed in U. S. Patent Nos. 2,449,933 and 2,449,934, to Giammaria. Berger et al. describe reaction products of thermal recycle stocks with phosphorus pentasulfide, in U. S. Patent No. 2,450,405. The reaction product of phosphorus pentasulfide and a sulfurized ketone is prepared in accordance with the disclosure of U. S. Patent No. 2,459,090, to Otto et al. In U. S. Patent No. 2,459,113, Oberright teaches that a reaction product is produced when the product obtained from reacting a hydroxyaromatic compound, an aldehyde, and a polyamine, is reacted with a phosphorus sulfide.

All of the reaction products described in these patents tend to evolve acidic gases, particularly hydrogen sulfide. Accordingly, they are contemplated to be within the scope of the present invention as reaction products which can be stabilized against the evolution of such gases.

Of special interest are the oil-soluble, phosphorus- and sulfur-containing reaction products obtained by reacting a dicyclic terpene with a phosphorus sulfide, at a temperature above about 100° C. Any one of the several known phosphorus sulfides, such as, for example, $P_3S_5$ (or $PS_2$), $P_4S_6$ (or $P_2S_3$), $P_4S_3$, $P_2S_5$, (or $P_4S_{10}$), $P_4S_7$, etc., can be used to prepare these reaction products. However, $P_2S_5$ is especially preferred.

"Dicyclic terpenes" are defined as those terpenes which are characterized by the presence of one double bond in the molecule and which are comprised of two ring systems. Typical of such terpenes are pinene, camphene, and fenchene. Also contemplated are those materials which are composed predominantly of one or more dicyclic terpenes. Representative of such materials are the essential or volatile oils, typically, turpentine, the predominant constituent of which is pinene. The reaction products of particular interest are those obtained from $P_2S_5$ and pinene, and $P_2S_5$ and turpentine.

As set forth in U. S. Patent No. 2,476,972, to Everett W. Fuller et al., the reaction temperature used to produce these reaction products should be at least about 100° C., and, preferably, between about 100° C. and about 160° C. The molar proportion of dicyclic terpene to phosphorus sulfide should be about 4:1, respectively, to produce a reaction product which is effective and which is readily soluble in petroleum oils. Another procedure utilizable to prepare these reaction products is to blend a dicyclic terpene in a comparatively inert solvent, such as a petroleum oil, and to react the blend with a phosphorus sulfide, as described hereinbefore and in the patent referred to.

The organic reaction product can contain other substances which are added thereto for various purposes. The disclosures of the following U. S. patents furnish non-limiting examples of combinations of this type. The combination of dibenzyl sulfide and a sulfide of a hydroxyaromatic compound is disclosed by Story et al., in U. S. Patent No. 2,028,257. Smith describes a combination of a sulfurized monoester of a fatty acid and an oil-soluble ester of an acid of phosphorus in U. S. Patent No. 2,231,301. U. S. Patent No. 2,252,133, to Morway et al. relates to the combination of a mildly sulfurized mineral oil and an ester of an acid of phosphorus. The combination of sulfurized mineral oil with an E. P. base is defined by Kaufman in U. S. Patent No. 2,296,037. U. S. Patent No. 2,315,072 to Nelson et al. relates to the combination of organic sulfides and corrosion inhibitors. In U. S. Patent No. 2,373,094, Berger et al. describe a combination of an alkyl phenol with the reaction product of a phosphorus sulfide and a thermal recycle stock. Noland teaches the combination of this reaction product with a sulfonate, in U. S. Patent No. 2,419,584. U. S. Patent No. 2,416,281, to Berger et al., discloses the combination of a metal sulfonate with the reaction product of a dicyclic terpene and a phosphorus sulfide. The combination of metal sulfonates or metal carboxylates with the reaction product of oleyl alcohol and phosphorus pentasulfide is disclosed in U. S. Patent No. 2,442,915, to Berger et al. A dicyclic terpene-phosphorus sulfide reaction product and a hydroxyaromatic ester of an organic carboxylic acid are disclosed in combination by Fuller et al. in U. S. Patent No. 2,455,668. In accordance with U. S. Patent No. 2,476,972, to Fuller et al., a dicyclic terpene-phosphorus sulfide reaction product is used in conjunction with an oil-soluble magnesium sulfonate detergent.

The organic reaction products are added to mineral lubricating oils in concentrations sufficient to stabilize the oils against oxidation, etc. Usually, such amounts vary between about 0.01 per cent and about 10 per cent, by weight. Reference should be made to the patents cited for specific preferred concentrations for each additive.

The aliphatic aldehydes which contain the group, C=C—C=O, include the aliphatic aldehydes which are α,β unsaturated with respect to the carbon atom which forms part of the aldehyde

group. They can be straight-chain or branched-chain aliphatic aldehydes. Aromatic aldehydes have not been found to be effective herein. The only heterocyclic aldehydes found utilizable are thiophene aldehydes. These compounds can also be unsaturated at other places in the molecule. Also, they can contain other substituent groups, such as aryl, halogen, amino, nitro and the like. Accordingly, the aryl-substituted aliphatic conjugated aldehydes are contemplated within the scope of the aliphatic conjugated aldehydes. However, in order to be effective for the purpose herein, the aldehyde must contain the group, C=C—C=O, and cannot have more than 10 carbon atoms per molecule. Non-limiting examples of these aldehydes are acrolein, crotanaldehyde, cinnamaldehyde, o-aminocinnamaldehyde, α,β hexenicaldehyde, 3-furylpropenal, tiglaldehyde, 4-chlorohexen-2-al, 2-ethyl-2-hexenal, nitrotiglaldehyde, bromoacrolein and amyl cinnamaldehyde.

The effective concentration of the aldehydes utilizable herein is dependent on several factors, such as the particular system used and the rate of acidic gas formation therein. When the aldehyde is added to a relatively concentrated system, such as a lubricant additive, it is used in amounts varying between about 0.5 and about 20 weight per cent. If on the other hand the aldehyde is added to a more dilute system, such as a lubricating oil composition or an aqueous solution, a lesser amount is required, namely, between about 0.001 per cent and about 1 per cent, based on the weight of the system. Accordingly, in general, the concentration of the aldehyde varies between about 0.001 per cent and about 20 per cent, based on the considerations discussed hereinbefore.

The following specific examples are for the purpose of demonstrating the effectiveness of this invention in suppressing the evolution of acidic gases from systems from which they evolve. It must be strictly understood, however, that the invention is not to be limited to the specific aldehydes or to the specific systems used therein. As will be apparent to those skilled in the art, a wide variety of other aldehydes and systems, as set forth hereinbefore, can be used in accordance with this invention.

The method used for evaluating the aldehydes contemplated in this invention was as follows: The desired amount of aldehyde was added to a system, such as pinene-$P_2S_5$ product, produced in a 4:1 molar ratio as described in U. S. Patent No. 2,476,972. Then, the mixture was heated at 80–100° C., with stirring, for a few minutes to produce a homogeneous system. Each system was then placed in a stoppered, 4-ounce, clear, glass bottle, filling the bottle about half way, and placed in storage at a place where it was exposed to sunlight. Each bottle was tested, at intervals, for the evolution of hydrogen sulfide, by placing a piece of moistened lead acetate paper in the bottle directly above the liquid surface for five seconds. The amount of hydrogen sulfide evolved was determined by the appearance of the lead acetate paper, in accordance with the following numerical rating:

(1) $H_2S$ very strong—lead acetate paper blackened immediately.
(2) $H_2S$ strong—lead acetate paper blackened after 5 seconds.
(3) $H_2S$ medium—lead acetate paper browned after 5 seconds.
(4) $H_2S$ weak—lead acetate paper turned light tan 5 seconds.
(5) $H_2S$ negative—lead acetate paper did not color in 5 seconds.

In applying this test, a rating of 1 or 2 is considered ineffective and a ratting of 3 is undesirable.

*Examples 1 through 3*

Crotonaldehyde, cinnamaldehyde and 2-thiophene aldehyde were blended with portions of the pinene-$P_2S_5$ reaction product. Pertinent test results on the resulting compositions are set forth in the following table:

| Example | Compound Added to Pinene-$P_2S_5$ Product | Concn. Wt. Per cent | Test Results | |
|---|---|---|---|---|
| | | | 1 Month Storage | 2 Months Storage |
| 1 | Crotonaldehyde | 5 | 5 | 5 |
| | do | 3 | 5 | 5 |
| 2 | Cinnamaldehyde | 5 | 5 | |
| | do | 3 | 4 | |
| 3 | 2-Thiophene Aldehyde | 5 | 5 | |
| | (Blank) | | 1 | 1 |

*Examples 4 through 7*

Blends of other compounds with the pinene-$P_2S_5$ were prepared and tested as described hereinbefore. A blend of furfural, which is analogous to 2-thiophene aldehyde proved to be relatively ineffective. Similarly, benzaldehyde was unsatisfactory, indicating that aromatic aldehydes are not effective herein. Mesityl oxide, an unsaturated ketone related to crotonaldehyde was ineffective as was butyraldehyde. The pertinent test data are set forth in the following table:

| Example | Compound Added to the Pinene-$P_2S_5$ Product | Concn. Wt. Per cent | Test Results | |
|---|---|---|---|---|
| | | | 20 Days Storage | 1 Month Storage |
| 4 | Furfural | 5 | | 3 |
| 5 | Benzaldehyde | 5 | | 3 |
| 6 | Mesityl Oxide | 5 | | 1 |
| | | 3 | | 1 |
| 7 | Butyraldehyde | 5 | 2 | 1 |

*Examples 8 and 9*

Two blends in the pinene-$P_2S_5$ product were prepared containing, respectively, two aldehydes having the group, C=C—C=O, but containing 10 or more carbon atoms. After 4 days' storage, a blend of 5 per cent of citral ($C_{10}$) in the pinene-$P_2S_5$ product gave at rating of 1. A blend of 3 per cent of octadecenyl aldehyde in the pinene-$P_2S_5$ product also had a rating of 1, after 12 days' storage.

It will be apparent that the addition of conjugated aliphatic aldehydes, having fewer than 10 carbon atoms, or of thiophene aldehyde, to systems which evolve hydrogen sulfide results in an effective suppression of the evolution of the hydrogen sulfide therefrom. Although this invention has been illustrated with respect to systems evolving hydrogen sulfide, when these aldehydes are added to systems which evolve other acidic gases, as defined hereinbefore, equally effective suppression is attained. Such suppression results in many advantages, as have been discussed hereinbefore.

Although the present invention has been described with preferred embodiments, it is to be understood that modifications and variations may be resorted to without departing from the spirit and scope thereof, as those skilled in the art will readily understand. Such variations and modifications are considered to be within the purview and scope of the appended claims.

What is claimed is:

1. A new composition of matter comprising (a) an oil-soluble, sulfur-containing organic reaction product which normally evolves hydrogen sulfide, and (b) a small amount, from about 0.5 per cent to about 20 per cent, by weight, of an aldehyde selected from the group consisting of aliphatic aldehydes having less than 10 carbon atoms and containing the group C=C—C=O, and thiophene aldehydes, to substantially inhibit the evolution of hydrogen sulfide from said sulfur-containing organic reaction product.

2. A new composition of matter comprising (a) an oil-soluble, phosphorus- and sulfur-containing organic reaction product which normally evolves hydrogen sulfide, said product having been produced by reacting a dicyclic terpene with a phosphorus sulfide, and (b) a small amount, from about 0.5 per cent to about 20 per cent, by weight, of an aldehyde selected from the group consisting of aliphatic aldehydes having less than 10 carbon atoms and containing the group C=C—C=O, and thiophene aldehydes, to substantially inhibit the evolution of hydrogen sulfide from said reaction product.

3. A new composition of matter comprising (a) an oil-soluble, phosphorus- and sulfur-containing organic reaction product which normally evolves hydrogen sulfide, said product having been produced by reacting a dicyclic terpene with a phosphorus sulfide, and (b) a small amount, from about 0.5 per cent to about 20 per cent, by weight, of an aliphatic aldehyde having less than 10 carbon atoms and containing the group C=C—C=O, to substantially inhibit the evolution of hydrogen sulfide from said reaction product.

4. A new composition of matter comprising (a) an oil-soluble, phosphorus- and sulfur-containing organic reaction product which normally evolves hydrogen sulfide, said product being produced by reacting pinene with phosphorus pentasulfide in a molar proportion of about 4 mols of pinene to 1 mol of phosphorus pentasulfide, at a temperature of from about 100° C. to about 160° C., and (b) a small amount, from about 0.5 per cent to about 20 per cent, by weight, of cinnamaldehyde, to substantially inhibit the evolution of hydrogen sulfide from said reaction product.

5. A new composition of matter comprising (a) an oil-soluble, phosphorus- and sulfur-containing organic reaction product which normally evolves hydrogen sulfide, said product having been produced by reacting pinene with phosphorus pentasulfide, in a molar ratio of about 4 mols of pinene to 1 mol of phosphorus pentasulfide, at a temperature of from about 100° C. to about 160° C., and (b) a small amount, from about 0.5 per cent to about 20 per cent, by weight, of crotonaldehyde, to substantially inhibit the evolution of hydrogen sulfide from said reaction product.

6. A new combination of matter comprising (a) an oil-soluble, phosphorus- and sulfur-containing organic reaction product which normally evolves hydrogen sulfide, said product having been produced by reacting pinene with phosphorus pentasulfide in a molar proportion of about 4 mols of pinene to 1 mol of phosphorus pentasulfide, at a temperature of from about 100° C. to about 160° C., and (b) a small amount, from about 0.5 per cent to about 20 per cent, by weight, of 2-thiophene aldehyde, to substantially inhibit the evolution of hydrogen sulfide from said reaction product.

7. A method for inhibiting the evolution of hydrogen sulfide from an oil-soluble, sulfur-containing organic reaction product which comprises adding to said reaction product a minor amount, from about 0.5 per cent to about 20 per cent, by weight, of an aldehyde selected from the group consisting of aliphatic aldehydes having less than 10 carbon atoms and containing the group C=C—C=O, and thiophene aldehydes.

8. A method for inhibiting the evolution of hydrogen sulfide from an oil-soluble, phosphorus- and sulfur-containing organic reaction product produced by reacting a dicyclic terpene with a phosphorus sulfide, which comprises adding to said reaction product a minor amount, from about 0.5 per cent to about 20 per cent, by weight, of an aldehyde selected from the group consisting of aliphatic aldehydes having less than 10 carbon atoms and containing the group C=C—C=O, and thiophene aldehydes.

9. A method for inhibiting the evolution of hydrogen sulfide from an oil-soluble, phosphorus- and sulfur-containing reaction product which comprises adding to said reaction product a minor amount, from about 0.5 per cent to about 20 per cent, by weight, of an aliphatic aldehyde having less than 10 carbon atoms and containing the group C=C—C=O.

10. A method for inhibiting the evolution of hydrogen sulfide from an oil-soluble, phosphorus- and sulfur-containing reaction product produced by reacting pinene with phosphorus pentasulfide in a molar proportion of about 4 mols of pinene to 1 mol of phosphorus pentasulfide, at a temperature of from about 100° C. to about 160° C., which comprises adding to said reaction product a minor amount, from about 0.5 per cent to about 20 per cent, by weight, of cinnamaldehyde.

11. A method for inhibiting the evolution of hydrogen sulfide from an oil-soluble, phosphorus- and sulfur-containing reaction product produced by reacting pinene with phosphorus pentasulfide in a molar proportion of about 4 mols of pinene to 1 mol of phosphorus pentasulfide, at a temperature of from about 100° C. to about 160° C., which comprises adding to said reaction product a minor amount, from about 0.5 per cent to about 20 per cent, by weight, of crotonaldehyde.

12. A method for inhibiting the evolution of hydrogen sulfide from an oil-soluble phosphorus- and sulfur-containing reaction product produced by reacting pinene with phosphorus pentasulfide in a molar proportion of about 4 mols of pinene to 1 mol of phosphorus pentasulfide, at a temperature of from about 100° C. to about 160° C., which comprises adding to said reaction product a minor amount, from about 0.5 per cent to about 20 per cent, by weight, of 2-thiophene-aldehyde.

References Cited in the file of this patent

UNITED STATES PATENTS

| Number | Name | Date |
|---|---|---|
| 2,497,097 | Roberts | Feb. 14, 1950 |
| 2,571,739 | Marsh | Oct. 16, 1951 |